Aug. 22, 1939.  J. D. FERRY  2,170,775
FOOD IMPELLING MECHANISM
Filed Sept. 2, 1937  2 Sheets-Sheet 1
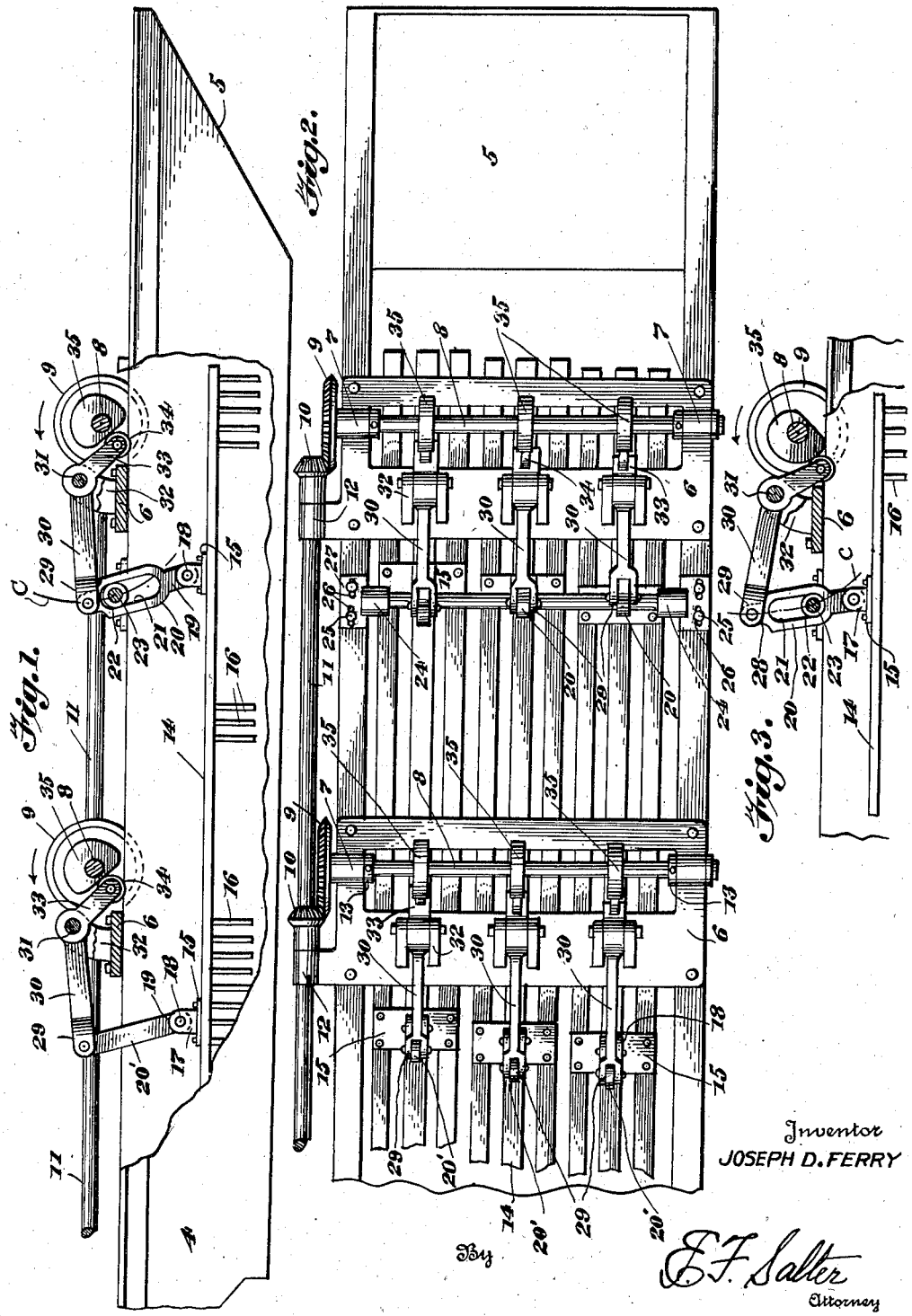
Inventor
JOSEPH D. FERRY
By E. F. Salter
Attorney Aug. 22, 1939.  J. D. FERRY  2,170,775
FOOD IMPELLING MECHANISM
Filed Sept. 2, 1937  2 Sheets-Sheet 2
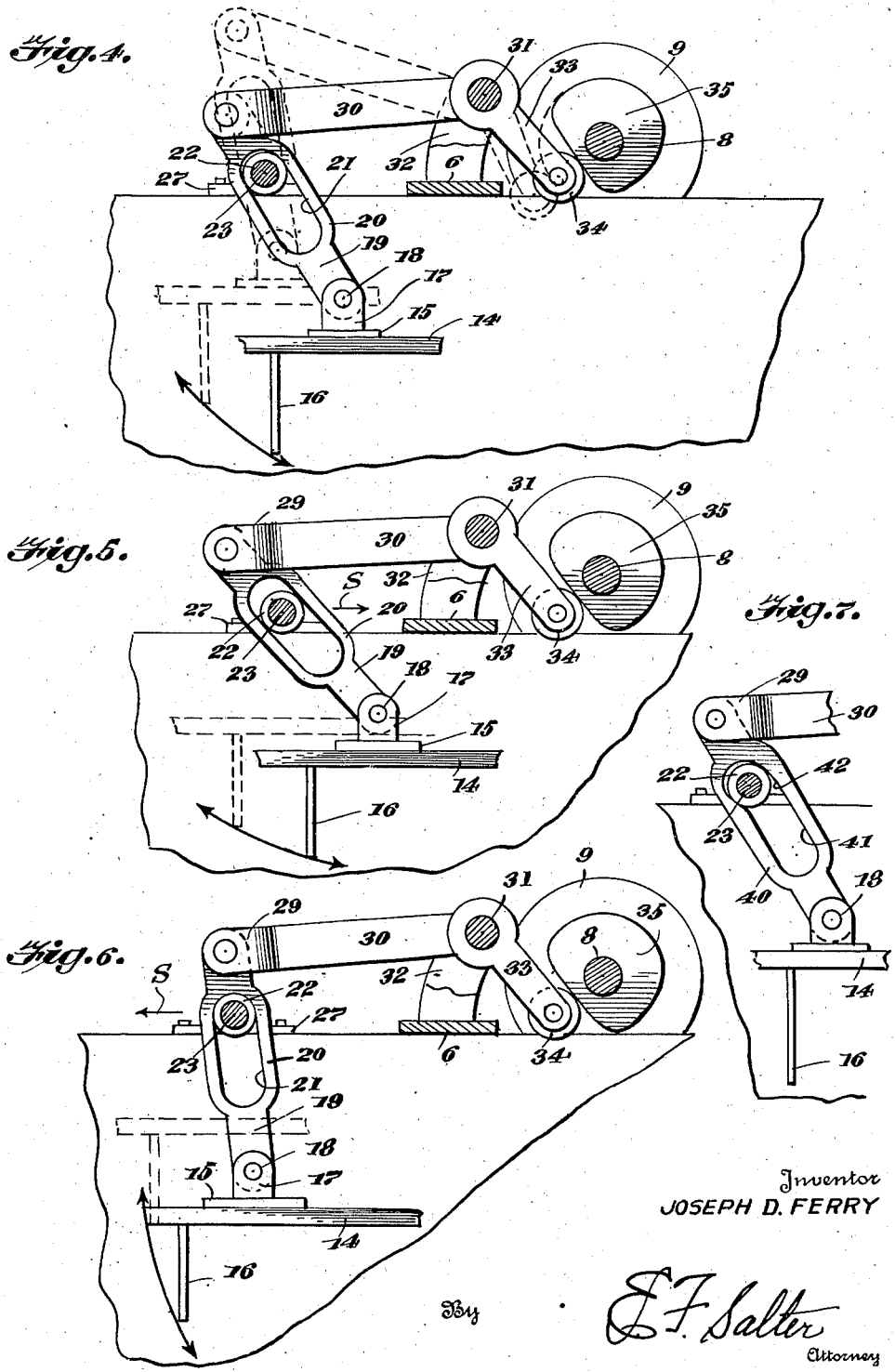
Inventor
JOSEPH D. FERRY Patented Aug. 22, 1939

2,170,775

UNITED STATES PATENT OFFICE 2,170,775

FOOD IMPELLING MECHANISM

Joseph D. Ferry, Harrisburg, Pa.; Sylvia O. Ferry, executrix of said Joseph D. Ferry, deceased Application September 2, 1937, Serial No. 162,211

17 Claims. (Cl. 53—7)

This invention relates to apparatus for treating articles of food, particularly to the cooking of vegetables such as potato chips.

Cooking apparatus of the general type disclosed in my United States Patent No. 2,056,845, dated October 6, 1936, utilizes impellers operable to advance the chips through a cooking kettle from inlet to outlet, repeatedly immersing the chips in a bath of cooking oil as they are moved through the kettle. Such impellers are of the rake type, having a plurality of depending tines which engage the chips, the rakes being so operated that the tines travel in an elliptical path. During each downstroke of the impellers the tines engage, immerse, and slightly advance the chips. Thus the duration of immersion always bears a definite relation to the rate of progression of the chips.

An object of this invention is to provide in a food treating apparatus having an impeller, means for adjusting the impeller stroke to vary and thus control the duration of immersion and the rate of progression of chips through the cooking oil.

Another object is to provide an impeller mechanism having chip engaging elements which are reciprocated in an arcuate path whereof the chord of the arc is inclined relative to the axis of travel of the chips, so that the chips are immersed and advanced by substantially a hoeing action of the impellers, instead of merely a raking action.

Still another object is to provide in such a mechanism, means adjustable to define different paths of travel for the chip engaging elements of the impellers.

Other objects will be readily apparent to those skilled in the art.

In the accompanying drawings forming a part of this specification, and wherein like reference characters denote like parts throughout the several views:

Figure 1 is a side elevation of a cooking kettle as equipped with the impeller mechanism of this invention, the kettle being partly broken away.

Figure 2 is a top plan view thereof.

Figure 3 is a fragmentary elevation, similar to Figure 1, and illustrating the impeller means in elevated position.

Figure 4 is a fragmentary elevation illustrating by full and dotted line showing the cycle of movements of the impeller actuating means and impeller.

Figure 5 is a similar elevation illustrating the cycle of movements when the guide shaft 23 has been adjusted in the direction of the arrow S to lessen the radius of the arc of impeller movement and effect an increase in the extent of advancing movement of the impeller.

Figure 6 is a similar elevation illustrating the cycle of movements when the guide shaft has been adjusted in an opposite direction to increase the radius of the arc of impeller movement and decrease the extent of advancing movement of the impeller.

Figure 7 is a fragmentary elevation illustrating the use of an alternative form of suspension link by which the impeller is given an increased advancing movement as it approaches its lower limit of arcuate reciprocation.

As shown, the apparatus comprises a cooking kettle 4 of the general construction disclosed in my aforesaid patent. The outlet end of the kettle is formed with an upwardly and rearwardly inclined bottom 5 for cooperation with conveyor means, not shown, by which the cooked chips are removed from the kettle. The kettle is adapted to contain a body of cooking liquid, preferably oil, through which the chips are moved from left to right as viewed in Figure 1, and the kettle is heated by suitable means, not shown, to produce a high temperature at the inlet end with a gradually diminishing temperature toward the outlet end, the difference in temperature serving to aid in the advancement of chips through the kettle.

Frames 6 extend transversely across the open top of the kettle at suitably spaced intervals and provide fixed supports for bearings 7 in which are journalled transverse cam shafts 8 having fixed to their ends, on the same side of the kettle, bevel gears 9 meshed with pinions 10 fixed on a drive shaft 11 that extends longitudinally along the side of the kettle in bearings 12 carried by the frames 6. The shaft 11 is driven from any suitable power source, not shown. Stop collars 13 fixed to the cam shafts 8 inwardly of the bearings 7 cooperate with the gears 9 to prevent axial shifting of the cam shafts in their bearings.

As best shown in Figure 2, the impellers comprise a plurality of longitudinally extending rake bars 14 connected in parallel spaced relation by pairs of cross plates 15, spaced longitudinally on the bars. As here shown the plates 15 connect the rake bars in three sets of three bars each, but any desired number of sets and of bars in each set may be employed, depending on the width of the kettle and service requirements. Each bar is provided with a longitudinal series of depending tines 16 which, in the extreme lowered position of the bars as seen in Figure 1, engage for a portion of their length in the mass of chips being cooked. Preferably, the tines are vertically disposed, but they may be angled as desired.

Each plate 15 carries a pair of upstanding spaced ears 17 mounting a transverse pivot pin 18. At one end of the impeller each pivot pin 18 is pivotally mounted the lower end 19 of a link 20 provided with a longitudinal slot 21 which plays over a loose roller 22 on a transverse shaft 23. Brackets 24 on the upper side edges of the kettle support the roller shaft 23 transversely of the kettle and parallel to the cam shafts 8. Each bracket is attached by means of bolts 25 threaded in the kettle wall and passed through slots 26 in a foot plate 27 forming an integral part of the bracket. The slots 26 are disposed longitudinally of the kettle so that the brackets 24 and consequently the roller shaft 23 may be adjusted longitudinally of the kettle, for a purpose to be described.

At the opposite end of the impeller the plates 15 connect through the pivot pins 18 with the lower ends of solid links 20', although if desired the slotted links may be employed at both ends. It has been found, however, that slotted links are necessary only at one end as such an assembly gives the requisite motion translating action.

Each link 20 and 20' has its upper end 28 pivotally suspended from a yoke 29 at the end of the long arm of a bell-crank rocker lever 30 fulcrumed at 31 on a pivot pin supported between a pair of upright spaced ears 32 carried by a portion of the frame 6. The short arm 33 of the rocker lever mounts at its end a roller 34 that is continuously engaged against a cam 35 fixed to the cam shaft 8, the dead weight drag of the rake bars acting to maintain the roller in contact with the cam.

It will be apparent from Figure 2 that each set of rake bars is pivotally slung from two spaced links 20 and 20' aligned longitudinally of the kettle, there being a rocker lever and cam for each link support. The setting of the cams determines the timing of the strokes for the various sets of rake bars, which may be as desired.

In operation, as the shaft 11 is driven it will in turn drive the cam shafts 8 and the cams will cause the levers 30 to rock on their fulcrums in accordance with the contours of the cams. With respect to Figure 1, the shafts 8 are rotated counter-clockwise as shown by the arrows, the figure illustrating the extreme lowered position of the rake bars and tines. As the cams depress the short arms 33 of the rock levers they will be rocked clockwise to elevate the links 20 and 20' and thus lift the rake bars to the position shown in Figure 3. As the cams continue to rotate the movement of the parts will be reversed and the links and rake bars will be lowered.

In this cycle of movements the links 20 have a compound movement of reciprocation in a vertical plane combined with oscillation in a vertical plane perpendicular to the plane of reciprocation, the rollers 22 on the shafts 23 providing horizontal fulcrums as well as guides. Thus, as the pivoted upper ends of the links oscillate through vertical arcs indicated by the curved lines C in Figures 1 and 3, the pivot pins 18 connecting the lower ends of the links and the rake bars will likewise reciprocate through arcs, as will also the tines 16, the chords of the arcs being angled relative to the axis of travel of chips through the kettle. The tines will, of course, have the arcuate line movement indicated by the arrows in Figures 4, 5, and 6, so that they enter the mass of chips while moving forwardly and downwardly with respect to outlet end of the kettle. The tips of the tines 16 will travel in spaced parallel arcuate paths and as the tines themselves are vertically disposed they will engage the chips with a combined immersing and propelling action, advancing the chips while immersed.

It is obvious that the radius of the arc of the impeller stroke may be increased or decreased by shifting the combined fulcrum and guide shaft 23 to increase or decrease its spacing from the cam shaft 8 as indicated by the arrows S in Figures 5 and 6. The greater the spacing, the greater is the arc radius and the lesser is the duration of chip immersion and extent of advancement. Thus, the adjustability of the shaft 23 longitudinally of the kettle provides a variable control means for regulating the duration of immersion and rate of progression of the chips through the kettle.

The slotted links 20 may, if desired, be replaced by the form of link 40 as shown in Figure 7. In this embodiment the link is provided with a longitudinal slot 41 which takes over the roller 22 of the guide shaft 23. At its upper end the slot 41 has a portion 42 inclined rearwardly from the axis of the slot 41 so that in the descending movement of the link as the roller fulcrum 22 enters the inclined portion 42 the lower end of the link, and consequently the impeller 14, will be given a sharply increased forward movement occurring in substantially a horizontal plane as the impeller arrives at the lower limit of its arcuate reciprocation. This results in a pronounced horizontal advancing movement of the impeller and imparts a definite advance to the food articles engaged by the impeller tines and while they are submerged.

Having thus described the invention, what is claimed is:

1. In a food treating apparatus, a container for treating liquid and adapted to have articles of food moved therethrough, an impeller in said container, a driven element oscillatable through a vertical arc, a member pivotally suspending said impeller from said driven element, motion translating means engaging said member in a manner to confine travel of said impeller to opposite reciprocal movements in the same arcuate path, and means for driving said driven element whereby to reciprocate said impeller in its path of permissible movement.

2. In a food treating apparatus, a container for treating liquid and adapted to have articles of food moved therethrough, food impeller means in said container, a driven element oscillatable through a vertical arc, means pivotally suspending said impeller means from said driven element, motion translating means engaging said suspension means in a manner to confine travel of the impeller means to opposite reciprocal movements in a single vertical arc, said translating means being adjustable relative to the suspension means to vary the path of permissible movement of said impeller means, and means for driving said driven element to reciprocate said impeller means in its path of permissible movement.

3. In a food treating apparatus, a container for treating liquid and adapted to have articles of food moved therethrough, a food impeller in said container, a driven element on said container and operable through a vertical arc, means pivotally suspending said impeller from said driven element, means for driving said driven element to impart vertical reciprocation to said impeller, and a guide carried by said container in engagement with said suspension means to confine the reciprocation of said impeller to an arc having a chord inclined with respect to the axis of travel of food articles through the container.

4. In a food treating apparatus, a container for treating liquid and adapted to have articles of food moved therethrough, a substantially horizontal food impeller in said container and having a depending food engaging member, a pair of driven elements on said container and spaced longitudinally thereof, a link connecting each of said driven elements with said impeller, means for driving said driven elements to effect vertical reciprocation of said impeller, and a fixed guide on said container in operative engagement with a link to confine reciprocation of said impeller to an arc having a chord inclined with respect to the longitudinal axis of travel of food articles through the container.

5. In a food treating apparatus, a container for treating liquid and adapted to have articles of food moved therethrough, a substantially horizontal food impeller in said container and having a depending food engaging member, a pair of driven elements on said container and spaced longitudinally thereof, a link pivotally suspending said impeller from each driven element, means for driving said driven elements to effect vertical reciprocation of said impeller, fixed guide means on said container in engagement with a link to confine reciprocation of said impeller to an arc having a chord inclined with respect to the axis of travel of food articles through the container, and said guide means being adjustable to vary the radius of the arc of reciprocation of said impeller.

6. In a food treating apparatus, a container for treating liquid and adapted to have articles of food moved therethrough, a substantially horizontal food impeller in said container and having a depending food engaging member, a rocker lever fulcrumed on said container to oscillate through a vertical arc, means for rocking said lever, a link pivotally suspended at one end from an end of said lever, said link having a longitudinal slot therein and a pivotal connection at its lower end with said impeller, a fixed shaft on said container and disposed through said link slot, and a roller loose on said shaft and engaging the sides of said link slot to provide a fulcrum on which said link may rock simultaneously with its reciprocation under the oscillation of said rocker lever.

7. In a food treating apparatus, a container for treating liquid and adapted to have articles of food moved therethrough, a substantially horizontal food impeller in said container and having a depending food engaging member, a rocker lever fulcrumed intermediate its ends on said container, a link pivotally suspended at one end from an end of said lever and pivotally connected at its other end to said impeller, means for rocking said lever to effect through said link a substantially vertical arcuate reciprocation of said impeller in the container, said link having a longitudinal slot, a shaft carried by said container and disposed through the link slot to guide the link and provide a fulcrum therefor, and means for adjusting said shaft to different positions longitudinally of the container.

8. In a food treating apparatus, a container for treating liquid and adapted to have articles of food moved longitudinally therethrough, a substantially horizontal food impeller in said container longitudinally thereof and having a depending food engaging member, a rocker lever fulcrumed intermediate its ends on a wall of the container to rock in a vertical plane disposed longitudinally of the container, a cam shaft journalled across the top of said container, means for rotating said shaft, a cam on said shaft in operative engagement with one end of said lever to rock the same, a link pivotally suspending said impeller from the opposite end of said lever, and means fixed on said container in slidable engagement with said link to guide its vertical reciprocation through a fixed path, said means constituting a fulcrum for the link causing it to oscillate through a vertical arc while being vertically reciprocated under movement of said rocker lever.

9. In a food treating apparatus, a container for treating liquid, a supporting frame adjacent the container top, a rotating cam carried by said frame, a rocker lever fulcrumed on said frame to oscillate under action of said cam, an impeller in said container, a link pivotally connected at one end to said lever and at the other end to said impeller, and guide means on the frame engaging said link for translating the oscillatory movement of said lever into a reciprocatory arcuate movement of the impeller in a vertical plane.

10. In a food treating apparatus, a container for treating liquid, rotating cam means supported thereon, a rocker lever fulcrumed on the container to oscillate under action of said cam, an impeller in the container, a connecting member suspending said impeller from said lever, and fixed means carried by said container in operative engagement with said connecting member to translate the oscillatory movement of said lever into reciprocatory arcuate movement of the impeller in a vertical plane.

11. In a food treating apparatus, a container for treating liquid, a driving element thereon, a driven element thereon and operable by said driving element to oscillate through a vertical arc, an impeller in the container, means pivotally suspending the impeller from said driven element, and container carried means engaging said suspending means in a manner to translate the oscillatory movement of said driven element into reciprocatory arcuate movement of the impeller through a vertical plane in a single arc.

12. In a food treating apparatus, a container for treating liquid, a food impeller therein, means to impart up and down arcuate movements to said impeller in a vertical plane and in the same path, and means adjustable to vary the radius of the arcs of movement of the impeller.

13. In a food treating apparatus, a food impeller, means effecting vertical reciprocation of said impeller in a single arcuate path, means adjustable to vary the radius of the arc of reciprocation of said impeller, and said adjustable means comprising a part of said reciprocation effecting means.

14. In a food treating apparatus having a food impeller, means for operating said impeller and including a driven element oscillatable through a vertical arc, a link pivotally suspending the impeller from said driven element, said link having a longitudinal slot, and a fixed guide extending transversely through the link slot and providing a fulcrum for the link.

15. In a food treating apparatus having a food impeller, means for operating said impeller and including a driven element oscillatable through a vertical arc, a link pivotally suspending the impeller from said driven element, said link being slotted longitudinally with the upper end portion of the slot being angled relative to the slot axis, and a guide extending transversely through the slot and providing a fulcrum for the link.

16. In a food treating apparatus, a container for treating liquid and adapted to have articles of food moved therethrough, a food impeller in the container, a driven element on said container, means pivotally suspending said impeller from the driven element, means for driving said driven element to impart vertical reciprocation to the impeller, a guide on the container engaging said suspension means in a manner to confine reciprocation of said impeller to an arc having a chord inclined with respect to the axis of food travel through the container, and said guide being shiftable on the container for simultaneous variation of both the radius of said arc of reciprocation and the inclination of its chord with respect to the axis of food travel.

17. In a food treating apparatus, a container for treating liquid, a food impeller, impeller actuator means, means pivotally suspending said impeller from the actuator means, and motion translating means on the container in slidable and rotative engagement with said suspension means for compounding the movement thereof.

JOSEPH D. FERRY.